March 23, 1926. 1,578,189
C. A. DAWSON
FISHING LINE LEADER AND SNELL
Filed August 30, 1923
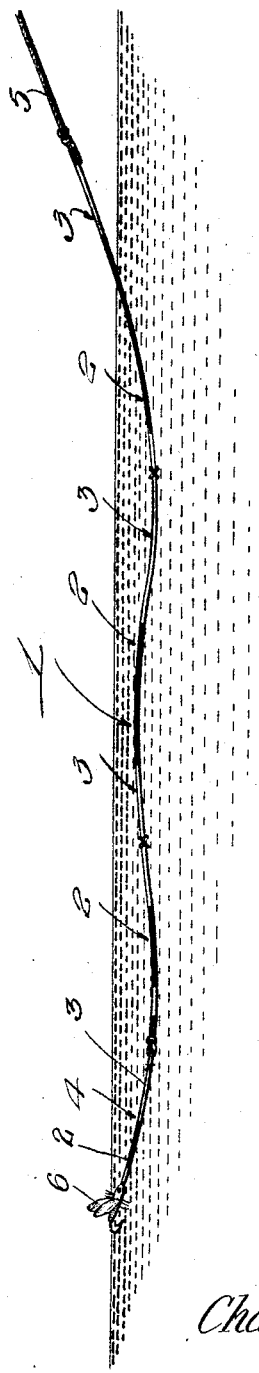
Inventor
Charles A. Dawson Patented Mar. 23, 1926.

1,578,189

UNITED STATES PATENT OFFICE.

CHARLES ARTHUR DAWSON, OF RIVER FALLS, WISCONSIN, ASSIGNOR TO KINNIC-KINNIC TACKLE COMPANY, OF STEVENS POINT, WISCONSIN, A CORPORATION OF WISCONSIN.

FISHING-LINE LEADER AND SNELL.

Application filed August 30, 1923. Serial No. 660,187.

*To all whom it may concern:*

Be it known that I, CHARLES ARTHUR DAWSON, a citizen of the United States, residing at River Falls, in the county of Pierce and State of Wisconsin, have invented certain new and useful Improvements in Fishing-Line Leaders and Snells; and I do declare the following to be a full, clear, and exact description of the invention, such as will enable others skilled in the art to which it appertains to make and use the same.

This invention relates to a leader or snell commonly used in fishing, which leader or snell usually carries a hook or fly and to the other end of which the fishing line is attached. It is well known to anglers that in fishing for certain fish, particularly, trout and bass, great caution must be exercised and it is desirable to have the fisher and tackle obscured as much as possible.

It is an object of this invention, therefore, to provide a leader or snell having adjacent portions of different colors effectively to camouflage the leaders or snells and thus render the same practically invisible in the water.

It is more specifically an object of the invention to arrange the leader or snell with longitudinal portions of different colors, and while various colors may be used, two colors which have been found desirable are an amber color and a sea green color.

These and other objects and advantages of the invention will more fully appear from the following description made in connection with the accompanying drawings in which like reference characters refer to the same parts throughout and in which, the single figure is a view in side elevation of a snell and leader secured to a portion of a line, a portion of the water being indicated.

Referring to the drawing, the leader is designated generally as 1 and is attached at one end to the line 5. The leader, preferably, is made of silkworm gut, catgut, or some similar substantially translucent material. The adjacent portions of the leader are formed of different colors. While said portions may cover any desired part of the leader, in the embodiment of the invention illustrated, the different colored parts are shown as longitudinal sections, one color extending entirely around the leader, such different colored parts being indicated on the drawing by the numerals 2 and 3. While, as stated, various different colors may be used, two colors which have been found very efficient in practice are an amber color and a sea green color, and in the drawing, said amber colored portion may be taken as represented by the black sections 2 and the intervening sections 3 represent the sea green portion. The snell 4 is shown attached to one end of the leader and carries at its other end the hook carrying fly 6. The color sea green is an efficient one for camouflage purposes as the water is usually of a greenish hue and any live vegetation in the water is usually green. The water and vegetation, therefore, form a background tending to obscure the green leader. The amber color is also effective particularly where the sun is shining on the water. Old or dead vegetation is often of a yellowish or amber shade, especially when the sun is on the water. This snell will be made of some suitable material, preferably of silkworm gut or catgut so that the same is substantially translucent and the snell will have adjacent portions of different colors, as already described, for the leader It is particularly stated that the phrase "different colors" used herein and in the claims is intended and should be construed to cover not only different basic or primary colors, but different shades of the same color, such as light green, dark green, sea green, and such as sulphur, chrome, amber, etc. It is particularly noted that for the purpose of this invention, black and white are considered as colors.

From the above description it is seen that applicant has provided a simple structure of leader or snell, one which can readily be produced and which is substantially invisible in water. The device has been demonstrated in actual practice and found to be very successful. The leader and snell are effectively camouflaged and are substantially invisible when submerged.

It will, of course, be understood, that various changes may be made in the form, details and proportions of the parts without departing from the scope of applicant's invention, which, generally stated, consists in a device capable of carrying out the objects above stated and such as shown and described and defined in the appended claims.

What is claimed is:

1. A fishing line snell or leader formed of substantially translucent material and having successive adjacent portions of different colors to render the same approximately invisible when in water.

2. A fishing line snell or leader formed of substantially translucent material and having successive adjacent portions colored, respectively, sea green and amber whereby the snell or leader is rendered substantially invisible when submerged in water.

3. A fishing line snell or leader formed of substantially translucent material having a series of portions thereof of one color and a series of portions disposed, respectively, between said first mentioned portions, the portions of said last mentioned series being of lighter color.

4. A fishing snell or leader having a series of longitudinal portions of one color and another series of longitudinal portions of a different color, the portions of the last mentioned series alternating respectively with the portions of said first mentioned series whereby the snell or leader is effectively camouflaged when submerged in water.

In testimony whereof I have hereunto affixed my signature.

CHARLES ARTHUR DAWSON.